May 29, 1956
M. DRESSLER ET AL
2,748,323
SUSPENSION JOURNAL FOR ROTATABLE ELEMENTS OF ELECTRICAL
APPARATUS, AND ESPECIALLY FOR
ARMATURES OF RELAYS
Filed Oct. 31, 1952
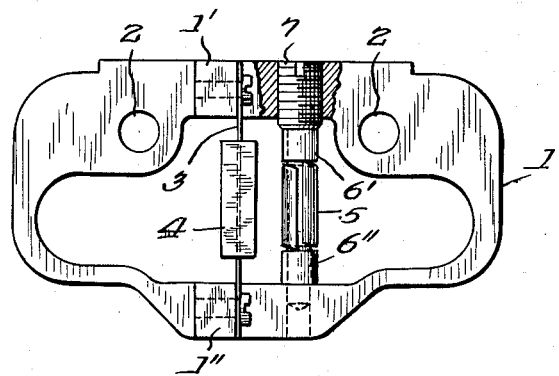
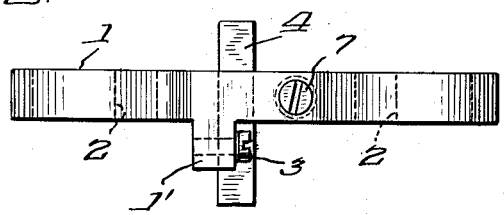
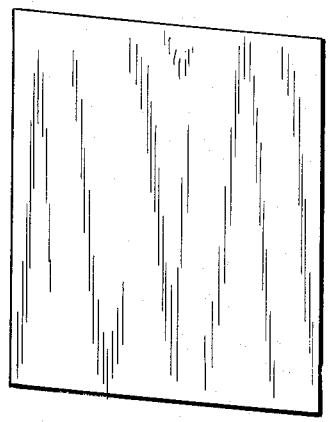
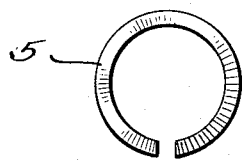
Inventors.
Max Dressler, &
Josef Fischer.
By
Atty.

United States Patent Office 2,748,323
Patented May 29, 1956

2,748,323

SUSPENSION JOURNAL FOR ROTATABLE ELEMENTS OF ELECTRICAL APPARATUS, AND ESPECIALLY FOR ARMATURES OF RELAYS

Max Dressler, Munich, and Josef Fischer, Munich-Pasing, Germany, assignors to Siemens & Halske Aktiengesellschaft, Munich, Germany, a corporation of Germany Application October 31, 1952, Serial No. 318,126

9 Claims. (Cl. 317—198)

This invention is concerned with a suspension mounting for the rotatable elements in measuring, registering, indicating or switching devices, and especially with a suspension mounting for relay armatures.

Suspension mountings employing tensioned suspension members, e. g., filaments, strips or bands are usually used for providing very sensitive and accurately adjustable journals in devices of the above noted types in all instances where the part or element that is to be journalled executes relatively small angular motions. The suspension member—usually a flat steel strip—is under tension fastened to a carrier member, yoke, ringlike member or the like, the carrier member supplying the tension thereto.

It was found that the carrier member is subject to material fatigue resulting frequently in an impermissible deterioration of the tension and thus destroying the intended journal. This is particularly felt in cases where the suspension member serves for securing the associated movable element in a certain zero position. The angularly effective securing force depends on the tension of the suspension member and lessens with deteriorating tension thereof.

In order to counteract the fatigue of the carrier member, supports in the form of bolts or the like were provided in parallel with the suspension member. The journals are thereby made useable for considerably longer times, but it was found that such expedient is in many cases insufficient, especially in connection with armature journals for highly sensitive and considerably worked electrical relays. It is in such cases from time to time necessary to readjust the journals by manually tightening the supporting bolts which are usually made in the form of screws. Such readjusting operations require, in finely adjusted measuring instruments and relays, a great deal of time, and generally cannot be carried out with the required care in the field, but only in the shop.

Readjusting operations of this kind are not required if the carrier member, yoke, ring or the like in which the suspension member is anchored is, in accordance with the invention, spread apart, i. e., tensioned by spring means acting in a direction paralleling the suspension member. The tensioning force exerted by this spring means must be very considerable. The spring, which is suitable for this purpose and also satisfies the requirements as to the least space that may be occupied thereby, comprises in accordance with the invention, a generally tubular or cylindrical spring made of a wide strip. This spring member operates in the nature of a helical compression spring. It is generally sufficient to make the spring member from a suitable spring sheet material cut in the form of a parallelogram and bent upon itself to form a single tubular or substantially cylindrical coil with a slot extending in parallel with the axis thereof.

Details of the invention will appear from the following description of an embodiment shown in the accompanying drawings. In these drawings, Fig. 1 is a partially elevational and partially sectional view of an embodiment comprising a carrier, a suspension member secured thereto, an element rotatably held by said suspension member, and spring means for tensioning the carrier so as to apply to the suspension member the required tension;

Fig. 2 shows the structure of Fig. 1 in elevational edge view;

Figs. 3a and 3b illustrate the new spring; and

Figs. 3c and 3d show the blank from which the spring is formed.

The carrier member 1 shown in Figs. 1 and 2 may be fastened on the frame or housing of a measuring instrument or on an electromagnetic relay by means of screws or the like projecting through the holes 2. A suspension member 3 is anchored in the carrier member at 1' and 1''. The suspension member supports the part or element 4 which is to be rotatably journalled, e. g., the pointer of a measuring instrument or the armature of an associated electromagnetic relay, respectively. This journalled element extends in a direction perpendicular to the plane of the drawing, Fig. 1. The suspension member 3 is a flat steel band of rectangular cross-section, having a bore formed therein at each end thereof for rivets used for fastening it upon the ears 1' and 1'' projecting from the side of the carrier member. The tensioning spring 5, which is on a larger scale shown in Figs. 3a and 3b, is disposed in parallel with the suspension member 3.

The spring 5 is made from a blank cut in the form of a parallelogram, as indicated in Figs. 3c and 3d, which is cylindrically rolled upon itself so that the vertically disposed edges form a slot extending axially longitudinally of the resulting cylindrical spring body. The upper and lower corners of the edges defining the slot are axially displaced.

The spring 5 is assembled with the carrier member 1 by means of a screw bolt 7 which is screwed into one arm thereof in the manner of a stub screw. The spring 5 and two bushings 6' and 6'' disposed at the opposite ends of the spring are loosely slipped upon the shank of the screw bolt 7 which projects with its opposite free end loosely into a hole formed in the opposite arm of the carrier 1. The screw bolt is reduced above the bushing 6' to form a shoulder engaging this bushing.

The spring 5 formed as described is axially compressed, responsive to tightening of the screw bolt 7, to place the carrier 1 under tension by exerting on the two arms a spreading force. Such force is resilient due to the configuration of the spring 5. This spreading force imposed upon the opposed arms of the carrier member is transmitted by these arms, due to their relative yieldability, to the suspension member 3 whereby the desired tension of the suspension member will be maintained. The tensioning force may be very considerable, without having to fear noticeable deterioration due to material fatigue.

Changes may be made within the scope and spirit of the appended claims which define what is believed to be new and desired to have protected by Letters Patent.

We claim:

1. In electrical apparatus of the class described having a rotatable operating element and a device for rotatably mounting said element, said device comprising a framelike carrier member having walls defining an opening, an elongated suspension member carrying said operating element, means for securing the opposite ends of said suspension member in engagement with opposite relatively yieldable walls of said carrier member, and a spring interposed in bearing relationship between said opposite walls of said carrier member exerting outward pressure on said walls tending to spread such walls apart for tensioning said suspension member.

2. The structure defined in claim 1, wherein said spring is a generally cylindrical spring.

3. The structure defined in claim 1, wherein said spring is a generally cylindrical spring having an axially extending longitudinal slot.

4. The structure defined in claim 2, comprising a boltlike fastening member extending between said opposite carrier walls for securing said cylindrical spring.

5. The structure defined in claim 2, comprising a boltlike fastening member extending between said opposite carrier walls for securing said cylindrical spring, and means for adjustably securing said fastening member in at least one of said opposite carrier walls.

6. The structurme defined in claim 2, comprising a boltlike fastening member extending between said opposite carrier walls for securing said cylindrical spring, and means for adjustably securing said fastening member in at least one of said opposite carrier walls to adjust the force exerted on said opposite walls by said spring.

7. The structure defined in claim 4, comprising a tubular bushing member disposed on said fastening member at each end of said cylindrical spring.

8. The structure defined in claim 4, comprising a tubular bushing member disposed on said fastening member at each end of said cylindrical spring to form a backing for such spring at each end thereof.

9. The structure defined in claim 2, comprising a boltlike fastening member extending between said opposite carrier walls for securing said cylindrical spring, means for adjustably securing said fastening member in at least one of said opposite carrier walls to adjust the force exerted on said carrier walls by said spring, and a tubular bushing member disposed on said fastening member at each end of said cylindrical spring to form a backing for such spring at each end thereof.

References Cited in the file of this patent

UNITED STATES PATENTS 2,425,408    Williams _____ Aug. 12, 1947

FOREIGN PATENTS 887,633    France _____ Nov. 18, 1943